Jan. 13, 1925.

C. S. FLOOD 1,523,188

EDUCATIONAL APPARATUS

Filed March 31, 1923

Inventor
CHARLOTTE S. FLOOD.

Patented Jan. 13, 1925.

1,523,188

UNITED STATES PATENT OFFICE.

CHARLOTTE SCOTHAN FLOOD, OF CLEVELAND, OHIO.

EDUCATIONAL APPARATUS.

Application filed March 31, 1923. Serial No. 629,132.

*To all whom it may concern:*

Be it known that I, CHARLOTTE S. FLOOD, a citizen of the United States, and a resident of Cleveland, in the county of Cuyahoga and State of Ohio, have invented a new and Improved Educational Apparatus, of which the following is a full, clear, and exact description.

This invention relates to improvements in educational apparatus, an object of the invention being to provide an apparatus for teaching geography, whereby the students actually place upon a globe maps which contain any desired data prepared by themselves in accordance with a model or pattern, and arrange said maps in a superimposed series on the globe; said maps caused to adhere to the globe and to each other in any approved manner, although I believe that it would be desirable to have the maps in the form of stickers, in other words containing mucilage or other adhesive which when moistened will cause them to adhere to the globe or to the maps beneath.

It is the broad idea of my invention to provide an apparatus of the character stated which embodies a globe or other analogous support on which both land and water are indicated, and provide maps of the representations of the land which, when properly outlined or filled in, or otherwise completed, can be placed on the illustrations of land on the globe, the maps being in a superimposed series so that the effect obtained is that of actually building the land upon the water and in proper sequence of development.

While I refer to my apparatus as educational, it may of course, constitute a toy or game apparatus, but in any event will serve to educate as well as amuse.

With these and other objects in view, the invention consists in certain novel features of construction and combinations and arrangement of parts, as will be more fully hereinafter described and pointed out in the claims.

In the accompanying drawings—

Figure 1:
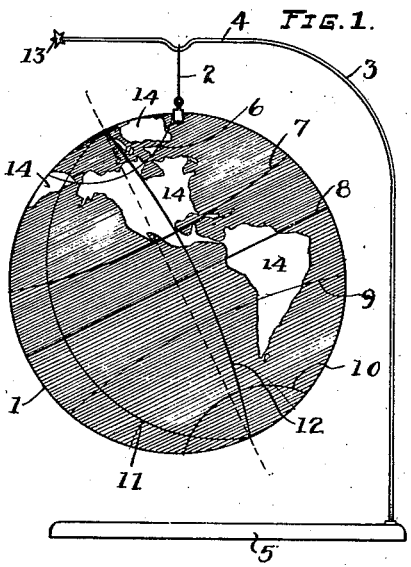
Figure 1 is a view in elevation illustrating one method of supporting the globe.

1 represents a globe which may constitute a rubber ball either hollow or solid, or it may be made of any other material, but of course, with the view of economical production.

This globe 1 is suspended in any approved manner by a flexible device 2 from the horizontal arm 4 of the standard 3, the latter fixed to a base 5.

The globe preferably contains lines 6, 7, 8, 9, and 10 to indicate the zones and also lines 11 and 12 indicating the 180th and 100th meridian respectively.

It is also desirable that the globe contain the Greenwich meridian which is hidden from view by the position of the globe, as illustrated in Figure 1. The globe is suspended from the line 6 indicating the Arctic Circle, and a star 13 indicating the North Star is supported on the arm 4 in line with the longitudinal axis of the globe.

The land or maps 14, are preferably of contrasting color to the rest of the globe, the preferable arrangement being to have the illustrations of land shown white and the illustrations indicating the water shown blue.

Although the invention is not limited to any color scheme, it is to be understood that I may provide any desired number of sets of maps in accordance with the information to be taught, and I have illustrated in Figures 2, 3, 4, 5 and 6, five maps of different sets, the maps all corresponding with a given portion of land, and it is to be understood that each and every portion of land on the globe will have similar sets of maps to cover the same.

Figure 2:
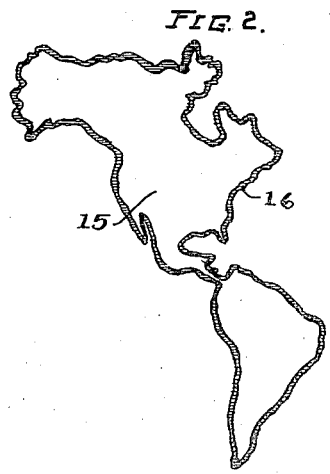
Figures 2, 3, 4, 5 and 6, are plan views of maps or representations of land conforming to such representations on the globe and adapted to be placed on the globe or upon each other in a superimposed series.

The map 15 indicated in Figure 2 is intended as the first map to be placed upon the globe, this map merely consists of a sheet having its edge outlined as shown at 16, preferably said outline being in blue to indicate the juncture of the land with the water. In outlining this map the student becomes familiar with the outline of the land and after it is completed it is pasted, or otherwise secured upon the corresponding land illustrations on the globe.

Figure 3:
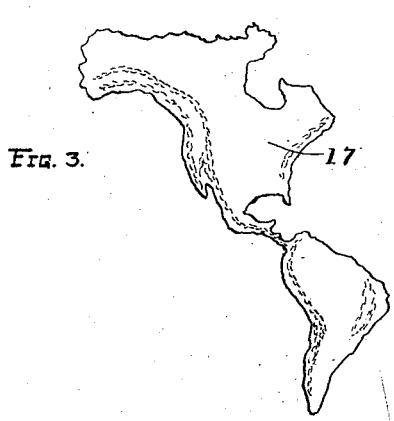

The map 17 illustrated in Figure 3 is to show the surface indicating mountains and low lands etc., and after this map is completed, it is pasted or otherwise secured on top of the map 15.

Figure 4:
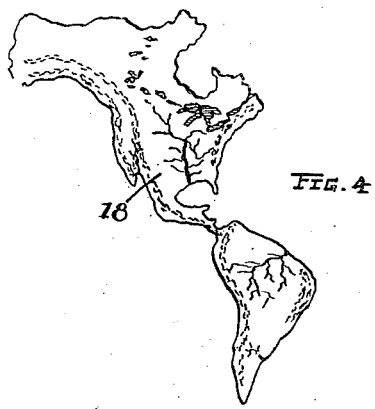

The map 18 shown in Figure 4 is to contain water ways and illustrates the drainage system, and this when completed, is pasted or otherwise secured on the map 17.

Figure 5:
Figure 6:

Map 19 indicated in Figure 5 in addition to the data contained on the other maps will be divided so as to indicate rain fall, and the map 20, in addition to the other data or without such other data is divided so that it indicates political sub-divisions and areas. It is, of course, to be understood that the invention is in no wise limited to the precise data or illustrations on the maps, nor to their order of use, as it is obvious that this is subject to a wide latitude in accordance with the desire of the teacher or the user. On the other hand the invention is broadly to the idea of providing a globe or analogous support with a series of maps or sheets indicating land, which are to be secured in a superimposed series upon the illustrations on the globe.

With an apparatus of this kind relatively small globes can be provided for small groups and a large globe for the entire class, the student doing the best work on a small globe being given the privilege of doing like work on the large globe so that competition may enter into the study with its known value.

Various slight changes might be made in the general form and arrangement of parts described without departing from my invention, and hence I do not limit myself to the precise details set forth, but consider myself at liberty to make such changes and alterations as fairly fall within the spirit and scope of the appended claims.

I claim:

1. An apparatus of the character described, comprising a support, a globe representing the earth suspended from said support and having thereon portions indicating the land and water divisions of the earth, and a plurality of maps to show geographic land illustrations and adapted to be affixed in a superimposed series upon the said land portions.

2. An apparatus of the character described, comprising a globe representing the earth and having thereon portions indicating land and water divisions of the earth, and a series of maps to contain different geographic illustrations and adapted to be affixed to the globe in a progressive superimposed series.

3. An apparatus of the character described, comprising a globe representing the earth, and having thereon portions indicating land and water divisions of the earth, and a plurality of series of superimposed maps adapted to be affixed progressively to the land illustrations on the globe.

4. An apparatus of the character described, comprising in combination a support, said support consisting of a base member, a standard carried thereby, a lateral arm projecting from the standard, said lateral arm carrying a device representing the North Star, and a globe representing the earth freely suspended from the said lateral arm in such position that the longitudinal axis of the globe and the device representing the North Star are in a direct line.

CHARLOTTE SCOTHAN FLOOD.